(12) United States Patent
Brown et al.

(10) Patent No.: US 8,199,891 B2
(45) Date of Patent: Jun. 12, 2012

(54) SYSTEM AND METHOD FOR REMOTE SCREEN MONITORING

(75) Inventors: Donald E. Brown, Zionsville, IN (US); Michael D. Gagle, Lafayette, IN (US)

(73) Assignee: Interactive Intelligence, Inc., Indianapolis, IN (US)

( * ) Notice: Subject to any disclaimer, the term of this patent is extended or adjusted under 35 U.S.C. 154(b) by 1136 days.

(21) Appl. No.: 12/026,947

(22) Filed: Feb. 6, 2008

(65) Prior Publication Data

US 2009/0196406 A1 Aug. 6, 2009

(51) Int. Cl.
*H04M 11/00* (2006.01)

(52) U.S. Cl. ............... 379/93.17; 379/90.01; 348/14.08

(58) Field of Classification Search ............... 379/90.17, 379/90.01; 348/14.01–14.12; 709/204–205
See application file for complete search history.

(56) References Cited

U.S. PATENT DOCUMENTS

| | | | |
|---|---|---|---|
| 5,704,042 A | 12/1997 | Hester et al. | |
| 5,995,096 A | 11/1999 | Kitahara et al. | |
| 6,204,847 B1 | 3/2001 | Wright | |
| 6,209,021 B1 | 3/2001 | Ahimovic et al. | |
| 6,560,637 B1 | 5/2003 | Dunlap et al. | |
| 6,608,636 B1 | 8/2003 | Roseman | |
| 6,690,654 B2 | 2/2004 | Elliott et al. | |
| 6,741,586 B1 | 5/2004 | Schuster et al. | |
| 6,750,897 B1 * | 6/2004 | Moshrefi et al. | 348/14.08 |
| 6,907,449 B2 | 6/2005 | Srinivasan | |
| 7,283,154 B2 * | 10/2007 | Shachar et al. | 348/14.08 |
| 7,453,815 B1 * | 11/2008 | Grabelsky et al. | 370/241 |
| 2004/0008837 A1 * | 1/2004 | Sylvain | 379/265.09 |
| 2005/0008000 A1 * | 1/2005 | Korycki et al. | 370/352 |
| 2005/0286699 A1 | 12/2005 | Gagle | |
| 2006/0080432 A1 | 4/2006 | Spataro et al. | |
| 2007/0263830 A1 * | 11/2007 | Wengrovitz et al. | 379/219 |
| 2009/0164640 A1 * | 6/2009 | Schultz et al. | 709/227 |
| 2009/0323552 A1 * | 12/2009 | Beers et al. | 370/254 |

OTHER PUBLICATIONS

Microsoft Corporation, Choosing a Microsoft Web Conferencing Solution, Published: Aug. 2007.

* cited by examiner

*Primary Examiner* — Melur Ramakrishnaiah (57) ABSTRACT

A computer system and method is disclosed for automatically establishing a screen sharing session between a first party and a second party based upon device associations. A computer telephony system establishes a telecommunication session between at least a first and second party. The computer telephony system receives a request for a screen sharing session from one party to the telecommunication session. Using a configuration plan, the computer telephony system is able to determine the proper computing devices between which to establish the screen sharing session absent user entry. A screen sharing session is created between the parties of the telecommunication session and optionally tied thereto.

26 Claims, 4 Drawing Sheets

| Telephone ID | User ID | Computer Address | Configuration | Current Status |
|---|---|---|---|---|
| 6824 | john_smith | 192.168.0.92 | | |
| 6895 | tom_jones | 192.168.5.62 | Permission=No | Connected to 7248 |
| . | . | . | . | |
| 7248 | bob_brown | 192.168.6.78 | Permission=Allow | Connected to 6895 |

SYSTEM AND METHOD FOR REMOTE SCREEN MONITORING

FIELD OF THE INVENTION

The present invention generally relates to telecommunication systems and methods, as well as computer telephone integration. More particularly, the present invention pertains to a system and method for automatically establishing a screen sharing session between selected parties to a telecommunication session using associated computing devices. The present invention facilitates the connection of screen sharing sessions without tedious user intervention, such as computer address entry, by tying the computing device of a user to the telecommunication device used.

BACKGROUND

The present invention relates to communication processing, and more particularly, but not exclusively, relates to automatically creating a screen sharing session between the parties of a telecommunication session in response to a request absent computer identifying information.

Typically, systems for screen sharing and collaborative virtual meetings require a user to set up two individual portions of the meeting. These portions include a voice portion, such as a conference call, and a screen sharing portion, such as a computer screen sharing session. Once set up, the participant to the meeting joins the voice portion by dialing a number supplied to them in advance or the meeting. By doing so they are connected to the other member(s) of the meeting. In addition, the participant must also download a software package and enter a unique server address of the computer hosting the screen sharing session. Once correctly configured, the participant is able to vocally participate in the meeting as well as view the screen of the presenter or another participant which may be displaying a workspace, presentation, or the like.

However, the numerous configuration requirements and various data required to be disseminated to the participants prior to a meeting can become cumbersome and may prevent users from taking advantage of the benefits that screen sharing may offer. As such, a need exists for a system which can rapidly create a screen sharing session between two parties in conjunction with a voice communication session absent specific computer identification entry by either user. As such, a user may request a screen sharing session be established during a telecommunication session and almost immediately be sharing their screen without stopping to configure a screen sharing program, distribute its server address to the participant, and require them to individually enter the address and connect to the session.

SUMMARY

Various technologies and techniques are disclosed for establishing a screen sharing session in conjunction with an existing telecommunication session in a telephony system. A first party established a telecommunication session with at least a second party via a computer telephony server. One party to the session then submits a screen sharing request to the server. The system determines the address of the computers associated with the telecommunication session and establishes a screen sharing session between the two without either party entering a network address. Additionally, screen sharing may be established for an additional user upon joining an existing telecommunication session, such as a conference.

One embodiment of the present invention is a unique communication technique. Other embodiments include unique systems, apparatus, devices, and methods for processing communications.

A further embodiment includes a technique for automatically conferencing a third party to a communication between a first and second party and providing a screen sharing session to the third party.

The communication channel can be based on standard Public Switched Telephone Network (PSTN) telephone lines, wireless telephone, and/or a publicly accessible computer network, such as the Internet, to provide an aurally perceived communication, to name just a few examples.

This summary is provided to introduce a selection of concepts in a simplified form that are described in further detail in the detailed description and drawings contained herein. This summary is not intended to identify key features or essential features of the claimed subject matter, nor is it intended to be used as an aid in determining the scope of the claimed subject matter. Yet other forms, embodiments, objects, advantages, benefits, features, and aspects of the present invention will become apparent from the detailed description and drawings contained herein.

DETAILED DESCRIPTION

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
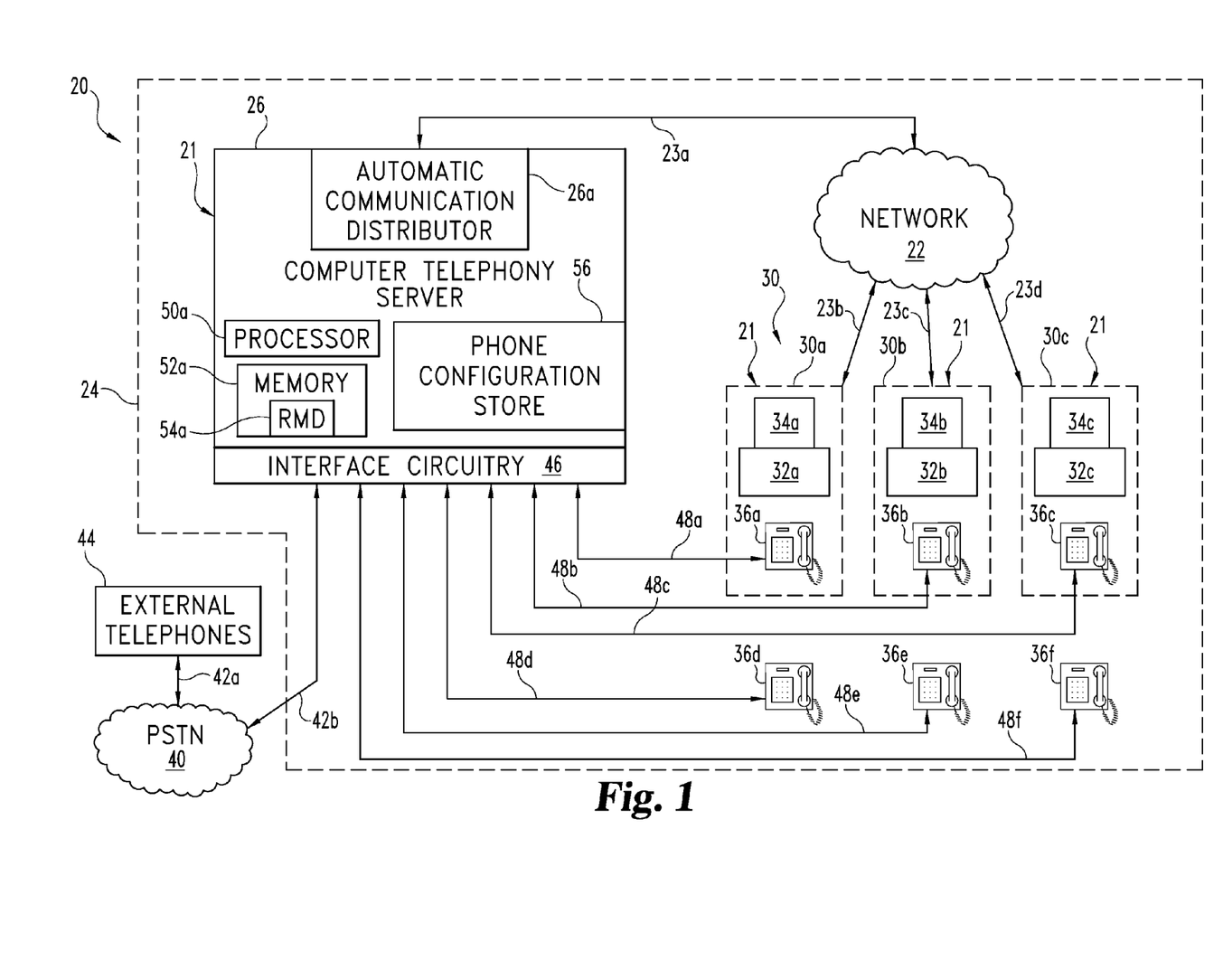
FIG. 1 is a schematic view of a communication system.

FIG. 1 is a diagrammatic view of computer system 20 of one embodiment of the present invention. Computer system 20 includes computer network 22. Computer network 22 couples together a number of computers 21 over network pathways 23. More specifically, system 20 has one or more servers, including Computer Telephony (CT) server 26 and user client workstations 30a, 30b, and 30c. CT server 26 may include hardware and/or software to define an Automated Communication Distributor (ACD) 26a. While computers 21 are each illustrated as being a server or client, it should be understood that any of computers 21 may be arranged to include both a client and server. Furthermore, it should be understood that while four computers 21 are illustrated, more or fewer may be utilized in alternative embodiments.

CT server 26 includes one or more processors or CPUs 50a and memory 52a that can be comprised of one or more types. Memory 52a includes a removable memory device (RMD) 54a. Although not shown to preserve clarity, each computer 21 of system 20 includes one or more processors or CPUs and one or more types of memory. Each processor may be comprised of one or more components configured as a single unit. Alternatively, when of a multi-component form, a processor may have one or more components located remotely relative to the others. Such components of each processor may be of the electronic variety defining digital circuitry, analog circuitry, or both. In one embodiment, each processor is of a conventional, integrated circuit microprocessor arrangement, such as one or more PENTIUM III or PENTIUM 4 processors supplied by INTEL Corporation of 2200 Mission College Boulevard, Santa Clara, Calif. 95052, USA.

Each memory (removable or generic) is one form of computer-readable device. Each memory may include one or more types of solid-state electronic memory, magnetic memory, or optical memory, just to name a few. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disk memory (such as a DVD or CD ROM); a magnetically encoded hard disk, floppy disk, tape, or cartridge media; or a combination of any of these memory types. Also, each memory may be volatile, nonvolatile, or a hybrid combination of volatile and nonvolatile varieties.

System 20 further illustrates Public Switched Telephone Network (PSTN) 40 coupled to interface circuitry 46 of server 26 by pathway 42b. For this embodiment, interface circuitry 46 is a computer controlled switch that is in the form of one or more telephone communication processing boards, such as those offered by INTEL Corporation under the DIALOGIC® brand, or by ACULAB. External telephones 44 are coupled to PSTN 40 by pathway 42a. Interface circuitry 46 is also coupled to telephone communication devices 36a, 36b, and 36c g(collectively designated as telephones 36) by pathways 48a, 48b, and 48c. For the sake of clarity, interface circuitry 46 is shown coupled to multiple telephones 36. However, it should be understood that each of telephones 36 may be coupled to one or more interface circuitries and that one or more interface circuitries 46 may be located at one or more physical locations. Interface circuitry 46 may be arranged in the form of hardware for a Private Branch Exchange (PBX), predictive dialer, Automatic Communication Distributor (ACD), a combination of these, or another switching configuration as would occur to those skilled in the art. Telephones 36 may be in the form of a handset, headset, or other arrangement as would occur to those skilled in the art. Telephones 36a, 36b, and 36c are each associated with a different one of user workstations 30a, 30b, and 30c, respectively (collectively designated as user workstations 30). User workstations 30 each include a user computer 32 coupled to a display 34. It shall be appreciated that a user computer 32 and/or display 34 may be referred to specifically as user computer 32a, 32b, or 32c or display 34a, 34b, or 34c as each is associated with one of user workstation 30a, 30b, or 30c respectively. In an alternate embodiment, telephones 36 man be SIP enabled telephones operatively coupled to a digital communication network such as the Internet utilizing IP telephony technology as is known in the art.

In one embodiment, user workstations 30 are used to administer the settings of one or more telephones 36. User computers 32 may be of the same type, or a heterogeneous combination of different computing devices. Likewise, displays 34 may be of the same type, or a heterogeneous combination of different visual devices. Although not shown to preserve clarity, each user workstation 30 may also include one or more operator input devices such as a keyboard, mouse, track ball, light pen, and/or microtelecommunicator, to name just a few representative examples. Also, besides display 34, one or more other output devices may be included such as loudspeaker(s) and/or a printer. It shall be appreciated that these workstations and corresponding telephones and computers may be located remotely from one another, such as in a different office, building, or geographic location depending upon the implementation of system 20.

Computer network 22 can be in the form of a Local Area Network (LAN), Municipal Area Network (MAN), Wide Area Network (WAN), such as the Internet, a combination of these, or such other network arrangement as would occur to those skilled in the art. The operating logic of system 20 can be embodied in signals transmitted over network 22, in programming instructions, dedicated hardware, or a combination of these. It should be understood that more or fewer computers 21 can be coupled together by computer network 22. It should also be recognized that computer network 22 may include one or more elements of PSTN 40. Indeed, in an alternate embodiment, PSTN 40 and computer network 22 are provided as a common network.

In one embodiment, system 20 operates as a communication system 24 at one or more physical locations that are remote from one another with server 26 being configured as an automatic communication distributor server host. While ACD 26a is shown defined by server 26, in other embodiments may only partially be defined by server 26 and/or defined with one or more other servers. Likewise, a common server (such as server 26) or other servers can be provided for computer network management, overflow, redundancy and the like. In one embodiment, Server 26 includes phone configuration store 56 that can be used by ACD 26a to determine the configuration settings of telephones 36 and their respective association with computers 32 of user workstations 30. Alternatively or additionally, phone configuration store 56 could also be located on one or more other servers. User workstations 30a, 30b, and 30c are each arranged as a communication client host. Additional telephones 36 may be connected to interface circuitry 46 and can be standalone or can correspond to an additional client host to provide more user workstations 30 (not shown). Typically communication system 20 would include many more user workstations of this type at one or more physical locations, but only a few have been illustrated in FIG. 1 to preserve clarity. Also, one or more servers 26 may be configured as a communication distributor server host at one or more physical locations.

Alternatively or additionally, system 20 may be arranged to provide for distribution and routing of a number of different forms of communication, such as digital/analog telephone calls, voice mails, faxes, e-mail, web chats, web call backs, and the like. Furthermore, business/customer data associated with various communications may be selectively accessed with system 20. This data may be presented to a user at each user workstation 30 by way of monitor 34 operatively coupled to the corresponding user computer 32, such as for use in a contact center.

Figure 2:
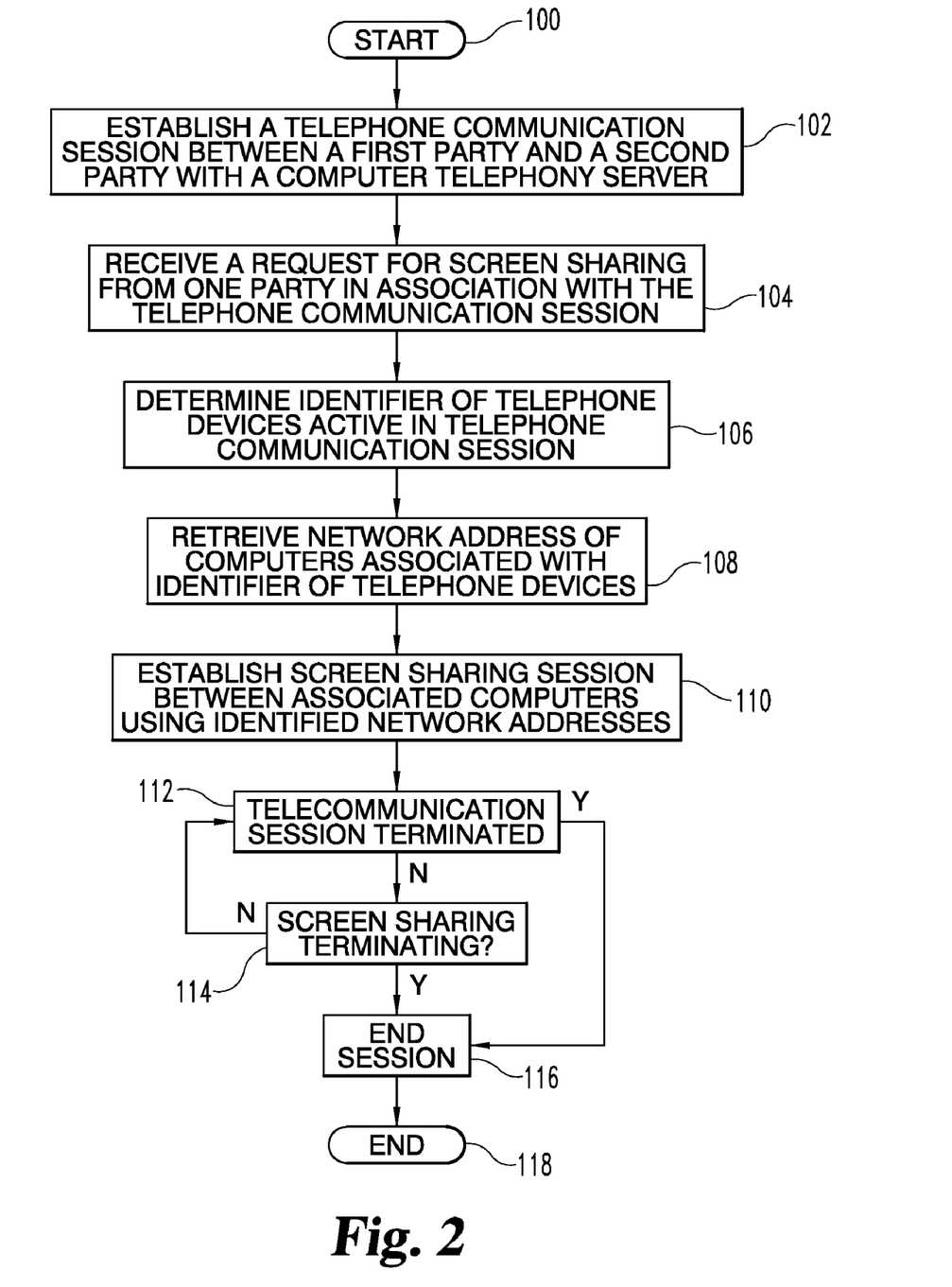
FIG. 2 is a flowchart of one procedure that can be implemented with the system of FIG. 1.

Referring additionally to FIG. 2, one embodiment for implementation with system 20 is illustrated in flow chart form as procedure 100, which demonstrates a process for establishing a screen sharing session in conjunction with a telecommunication session. In one form, procedure 100 is at least partially implemented in the operating logic of system 20, particularly server 26. Such logic can be in the form of software instructions, firmware instructions, dedicated hardware, or a combination of these.

Procedure 100 begins with automatic computer telephony server 26 establishing a telephone communication session between a first party and a second party (stage 102). In the illustrative embodiment, the telephone communication session is established in response to either the first party or the second party dialing the number associated with the other party, by interacting with a telephone integration software package installed on their corresponding computer 32 to effectuate the same, or by another method known to one of skill in the art and the other party answering.

For illustration purposes, assume that the first party is using telephone 36a of workstation 30a and that the second party is using telephone 36b of workstation 30b. Additionally, the first party is associated with computer 32a by nature of using workstation 30a and the second party is similarly associated with computer 32b. Additionally, the associations may be static or dynamic, such as based upon assignments made during deployment, scheduling, or current user logins. In the illustrative embodiment, these associations are maintained in a configuration plan stored in phone configuration store 56 of computer telephony server 26.

Once the telephone communication session is established in stage 102, the computer telephony server 26 receives a request for screen sharing from one of the parties in conjunction with the telephone communication session (stage 104). For example, the request may be received from the first party using telephone 36a. It shall be appreciated that the request may be received from the telephone 36 of either the first party or second party, such as by activation of a screen sharing key, or from the computer 32 associated with either party by the party selecting the appropriate option for screen sharing within an installed telephone integration software package. It shall also be appreciated that the request may also be received in conjunction with the initial telephone communication session creation or at any other time during the session.

The request may take one of two forms, including a request to share a selected portion of the screen of the first party's associated computer with the computer of the second party or a request by the first party to view a portion of the second party's screen. In either event, the device used to send the request, whether it is telephone 36a or computer 32a, is unaware of the address of computer 32b. As such, the request is necessarily free from any indication, such as the network name or address, of the computer 32b associated with the second party. Conversely, a similar request may be sent by the second party requesting to either share his screen or receive the screen of the first party. In this situation the request is necessarily free from any indication, such as the network name or address, of the computer 32a associated with the first party.

Upon receiving the screen sharing request, the computer telephony server 26 determines the identifiers of the telephones active in the associated telephone communication session (stage 106). In the preferred embodiment, the identifier is the telephone's extension, but in other embodiments the telephone may be identified by telephone number, IP address, extension, MAC address, username, or any other unique identifier known to one of skill in the art. The identifiers are determined using a listing of active calls stored in memory 52a and a configuration plan stored in phone configuration store 56 of computer telephony server 26 which includes a number of user profiles tying a telephone to a computer. As such, in accordance with the above example, the identifiers of telephones 36a and 36b would be determined.

For example, in the instance where the request is received from the first party via telephone 36a, the identifier of telephone 36a is included in the request. In addition, the computer telephony server is able to access the active call associated with telephone 36a and quickly determine the identifier of telephone 36b. In an alternate form, the request may be received from the first party via computer 32a. In this form, the request may include the identifier of the associated telephone 36a or the identifier may be looked up from the associations stored in phone configuration store 56 of computer telephony server 26. As such, the telephone identifier stored in association with computer 32a would be that of telephone 36a. The identifier of the other telephone to the session is identified from the active call associated with telephone 36a and determined to be the identifier of telephone 36b.

Figure 3:
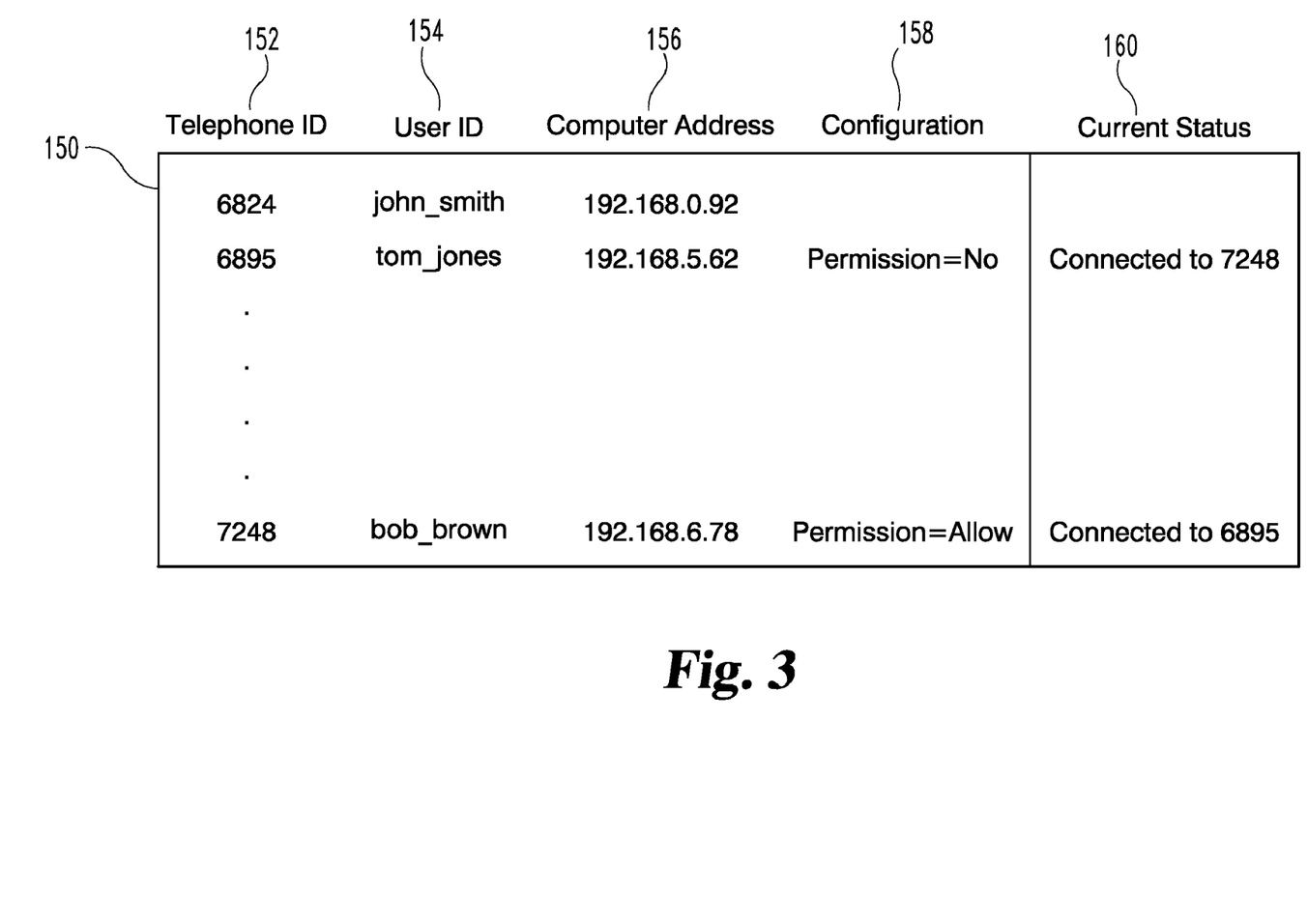
FIG. 3 is a logical view of a configuration profile suitable for use in the procedure of FIG. 2.

Turning briefly to FIG. 3, a logical view of a simple configuration plan for use by the process of FIG. 2 is illustrated. Configuration plan 150 is preferably stored electronically in the phone configuration store 56 of computer telephony server 26. Configuration plan 150 includes a plurality of rows each representing an association. Each row may include an entry in the telephone identifier column 152, user ID column 154, computer address column 156, configuration options 158, and current status 160. In accordance with the current example, the first party is using telephone 36a which is identified by telephone identifier "6895" in column 152. As such, it can easily be determined that the corresponding computer 32a for the first user is identified by the network address "192.168.5.62". Similarly, the second party is using telephone 36b which is identified by telephone identifier "7248" in column 152. Also, computer 32b associated with the second user is identified by the network address "192.168.6.78". Further, the configuration options in column 158 identify that the first party denies permission to all screen sharing requests and that the second party allows all screen sharing requests without prompting, such as might be the case for a contact center worker. Additionally, by viewing the current status column 160 associated with each column, the current call status of a telephone can be obtained. As such, when a request is received, the computer telephony server 26 may utilize the configuration plan 150 to cross reference the status of the telephone device or computer requesting the screen sharing session to locate the address of the computer associated with the other party to the telecommunication session with which the request is associated.

Once the telephone identifiers are obtained, the computer telephony server 26 utilizes them to look up the computers which correspond to the identified telephones. Using the configuration plan of phone configuration store 56, as described with respect to FIG. 3, the computer telephony server utilizes the telephone identifiers to determine the corresponding identifiers of the computers associated with the telephones. In the illustrative embodiment, the computer identifiers are network addresses, but in alternate forms, the identifiers may be network names or other unique identifiers known to one of skill in the art. In the alternate form described herein, where the request is received from the computer 32a for the first user, then the only computer identifier to be determined may be that of computer 32b associated with the second party.

Once the computer identifiers of computers 32a and 32b, corresponding to the first party and second party of the telecommunication session respectively, are identified, the screen sharing session may be established (stage 110). The screen sharing session is preferably established over a data channel, such as network 22 or the like. The data channel may also include portions of the Internet or other data networks. Preferably, the screen sharing session is established as a Realtime Transport Protocol (RTP) session over the User Datagram Protocol (UDP). As is required with all commercially acceptable video-conferencing or desktop collaboration platforms, the screen data within the screen sharing session is presented to the receiving user workstations in near real-time, which shall be construed to mean that the data is transmitted from the sending computer to the receiving computer in a time without substantial delay, which may naturally include any transmission delay or lag that is commonly acceptable in applications of this type due to bandwidth or latency issues. In a further preferred embodiment, the screen sharing session is encrypted to prevent unauthorized access to the screen information being transported. Additionally, the screen sharing request may be either a request to share or a request to receive a shared screen from either user. As such, the process for establishing the screen sharing session in response to each request may be customized with user permission requests or default settings in order to require a user's permission prior to sharing his associated screen with a requesting party.

Once the screen sharing session is established, the process monitors for the termination of the associated telecommunication session at process block 112. If the telecommunication session remains active, the process determines if a screen sharing session termination request has been received (stage 114). If no request is received, the process returns to monitor for termination of the telecommunication session. If the process determines that the associated telecommunication session has been terminated then the process closes the screen sharing session (stage 116) and the process ends at end point 118. Similarly, if the process receives a screen sharing termination request, then the process closes the screen sharing session (stage 116) and the process ends at end point 118. It shall be appreciated that in the illustrated embodiment, the screen sharing session is terminated upon the termination of the telephone communication session. However, in alternate forms, the screen sharing session may be allowed to persist depending upon configuration preferences.

Figure 4:
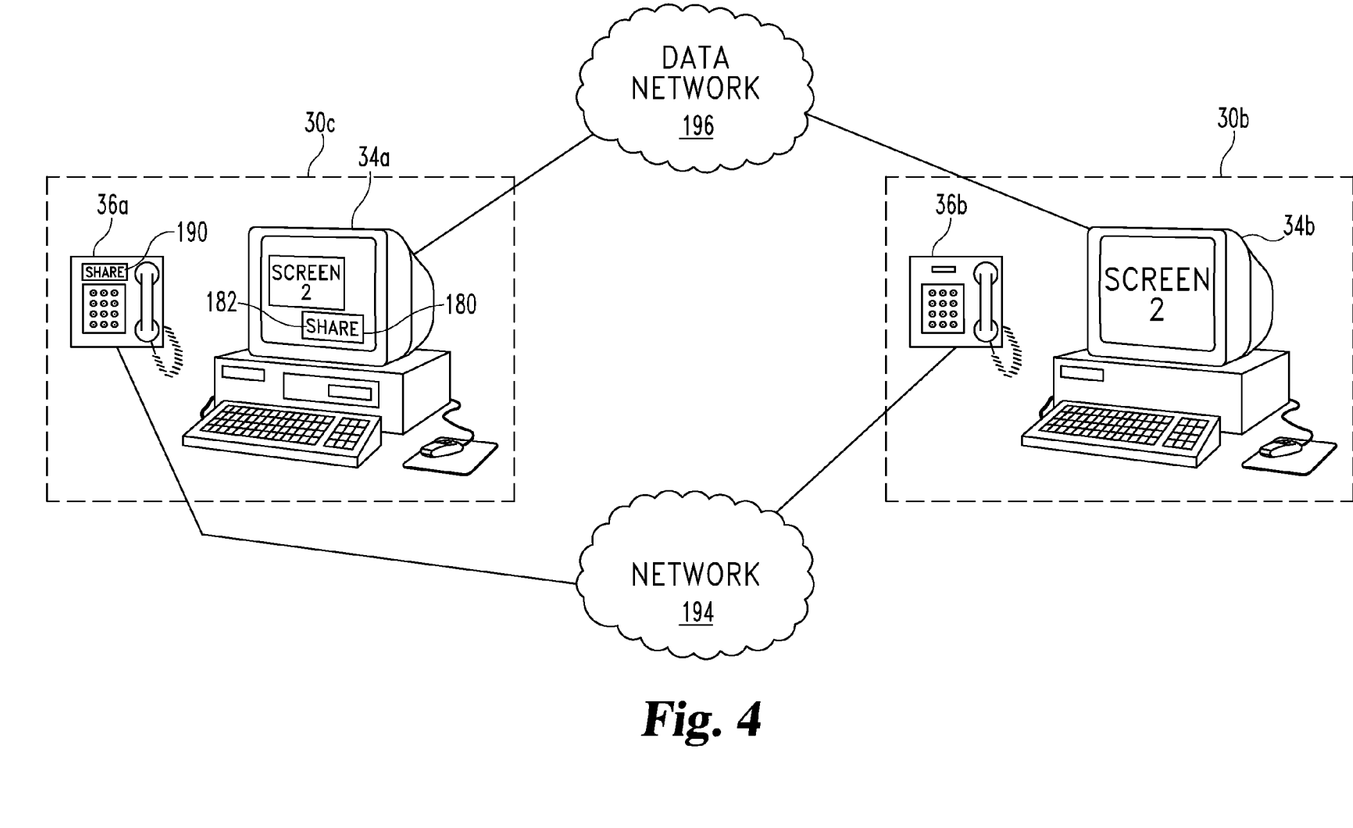
FIG. 4 is a partial diagrammatic view of a user station of FIG. 1 with Graphical User Interface (GUI) controls to send a screen sharing request in the procedure of FIG. 2.

FIG. 4 is a partial diagrammatic view of the user station 30a and 30b of FIG. 1 with Graphical User Interface (GUI) controls and telephone controls to establish a screen sharing session using the procedure of FIG. 2. Common objects between FIG. 1 and FIG. 4 will be similarly numbered to preserver clarity. Screen 34a includes a computer telephony integration application 180 running on computer 32a. The first party, associated with workstation 30a may initiate a screen sharing request by activating screen sharing button 182 of application 180 or by activating screen sharing button 190 of telephone 36a. In response to either of these indications during a live telephone communication session, such as over network 194, with telephone 36b of user station 30b, the screen "Screen 2" from monitor 34b will be transmitted via data network 196 to the monitor 34a for display in a window or selectively in full screen.

It shall be appreciated that the current concepts may be extended to include screen sharing during a conference including more than two parties. As such, screen sharing sessions may be hosted or established by server 26 to facilitate the transmission of screen data from one or more computers to a plurality of computers associated with telephones connected to the conference. In a further form, multiple screens may be simultaneously shared or selected from by a conference host.

Additionally, it shall be appreciated that for numerous purposes, including security, privacy, and efficiency, that screen sharing sessions are preferably tied to a respective telecommunication session and closed upon their termination. As such, a screen sharing session between two parties is terminated when either party to the communication hangs up. In further forms, a disconnection or other inadvertent hang up maybe detected, allowing the screen sharing session to persist for a short period of time in which the two parties may reconnect. Additionally, should it be desired, a screen sharing session may be configured to persist after termination of a telecommunication session, but this is not typically the default.

Alternatively or additionally, the communication session can be based on standard Public Switched Telephone Network (PSTN) telephone lines, wireless telephone, and/or a publicly accessible computer network, such as the internet, to provide voice or another aurally-perceived form of communication, to name just a few examples.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected.

What is claimed is:

1. A method comprising the steps of:
    establishing a telecommunication session between a first telecommunication device and a second telecommunication device with a computer telephony server, wherein said first telecommunication device is associated with a first computing device and said second telecommunication device is associated with a second computing device in an electronic configuration profile;
    receiving a request to share screen data between the parties of said telecommunication session, and
    hosting a screen sharing session between said first computing device and said second computing device in response to said request; wherein hosting the screen sharing session comprises:
        determining a first address corresponding to the network address of said first computing device and a second address corresponding to the network address of said second computing device using identifiers of the telecommunication devices corresponding to the parties in said telecommunication session and said electronic configuration profile;
        requesting at least a portion of the screen data displayed on said first computing device using said first address;
        receiving said screen data from said first computer; and
        transmitting said screen data to said second computing device using said second address in near real-time.

2. The method of claim 1, wherein said request to share screen data is received from said first computing device.

3. The method of claim 2, wherein said screen sharing request is sent from a computer telephone integration program running on said first computing device.

4. The method of claim 1, wherein said request to share screen data is received from said first telecommunication device.

5. The method of claim 4, wherein said screen sharing request is sent in response to the activation of a button located on said first telecommunication device.

6. The method of claim 1, wherein said first telecommunication device is a digital network endpoint.

7. The method of claim 6, wherein said digital network endpoint is a SIP telephone.

8. The method of claim 1, wherein said first and second network addresses are Internet Protocol (IP) addresses.

9. The method of claim 8, wherein said hosting includes providing a key to said first and said second computing devices.

10. The method of claim 8, wherein said screen sharing session comprises an RTP stream.

11. The method of claim 1, further comprising the steps of:
detecting that said telecommunication session is terminated; and
closing said screen sharing session in response to said detecting.

12. The method of claim 1, wherein said first and second devices and said first and second computers are associated with the same enterprise telephony system.

13. The method of claim 1, wherein said electronic configuration plan is based upon user logins.

14. The method of claim 1, wherein said request is free of any identifier of at least one of said first and second computing devices.

15. A method comprising the steps of:
establishing a digital teleconference between a first telecommunication device and a plurality of telecommunication devices with a computer telephony server, wherein said first telecommunication device is associated with a first computing device and said plurality of telecommunication devices are individually associated with a plurality of computing devices in an electronic configuration profile;
receiving a request to share screen data between the parties of said digital teleconference, wherein said request is free of any identifier of said plurality of computing devices; and
establishing a screen sharing session between said first computing device and said plurality of computing devices in response to said request, wherein establishing the screen sharing session comprises:
determining a first address corresponding to the network address of said first computing device and a plurality of network addresses corresponding to the network address of said plurality of computing devices based upon the telecommunication devices corresponding to the parties in said digital teleconference and said electronic configuration profile;
requesting at least a portion of the screen data displayed on said first computing device using said first address;
receiving said screen data from said first computer; and
transmitting said screen data to each computing device within said plurality of computing device using said plurality of addresses in near real-time.

16. The method of claim 15, wherein said plurality of telecommunication devices includes at least two telecommunications devices.

17. The method of claim 16. wherein said identifier is an Internet Protocol (IP) address.

18. The method of claim 17, wherein said first address is an Internet Protocol (IP) address.

19. The method of claim 18, wherein said screen data is transmitted as an RTP stream.

20. The method of claim 15, wherein said request to share screen data is received from said first telecommunication device.

21. The method of claim 15, wherein said request to share screen data is received from said first computing device.

22. The method of claim 15, further comprising the steps of:
adding an additional party to said digital teleconference;
determining an additional address corresponding to the network address of an additional computing device based upon the telecommunication device corresponding to said additional party and said electronic configuration profile; and
transmitting said screen data to said additional computing device using said additional addresses in near real-time.

23. A system comprising:
a data network to provide a plurality of data and voice communication channels;
a first and second digital network telephone connected to said data network, each network telephone operable to communicate a voice signal as voice-over-data packets on a voice communication channel and to receive voice-over-data packets from said voice communication channel, and convert them to audible voice signals;
a first computer connected to said data network, said first computer operable to receive a screen sharing acknowledgement and in response transmit screen data corresponding to a portion of the current display on the associated monitor on a data communication channel over said data network to an address specified by said request;
a second computer connected to said data network, said second computer operable to receive screen data from another computer on a data communication channel over said data network and display said data on an associated monitor;
a server connected to said data network, said server operable to receive a screen sharing request in association with a telecommunication session from a computer associated with a requesting telephone over said digital network and determine a computer address corresponding to the network address of the computer associated with the other telephone active in said telecommunication session and forward said computer address to said computer in a screen sharing acknowledgement;
wherein said server stores an electronic configuration plan associating at least one network telephone to at least one computer; and
a screen sharing application on said first computer, said application operable to send a request to said server to share the screen of said first computer with the computer of another party in association with an existing telecommunication session.

24. The system of claim 23, wherein said first and said second digital network telephones are SIP enabled phones.

25. The system of claim 24, wherein said computer address is an Internet Protocol (IP) address.

26. The system of claim 25, wherein said electronic configuration plan associates a network telephone with a computer based upon user logins.

* * * * *

UNITED STATES PATENT AND TRADEMARK OFFICE
CERTIFICATE OF CORRECTION

| | | |
|---|---|---|
| PATENT NO. | : 8,199,891 B2 | Page 1 of 1 |
| APPLICATION NO. | : 12/026947 | |
| DATED | : June 12, 2012 | |
| INVENTOR(S) | : Donald E. Brown and Michael D. Gagle | |

It is certified that error appears in the above-identified patent and that said Letters Patent is hereby corrected as shown below:

Column 1, Line 30:

The applicable text reads "in advance or the meeting". It should read "in advance of the meeting".

Column 3, Line 36:

The applicable text reads "and 36c g(". It should read "and 36c (".

Column 10, Line 21:

Claim 23 has a "," after "channel" which needs to be deleted.

Signed and Sealed this
Twenty-eighth Day of August, 2012

David J. Kappos
*Director of the United States Patent and Trademark Office*